Figure 7:
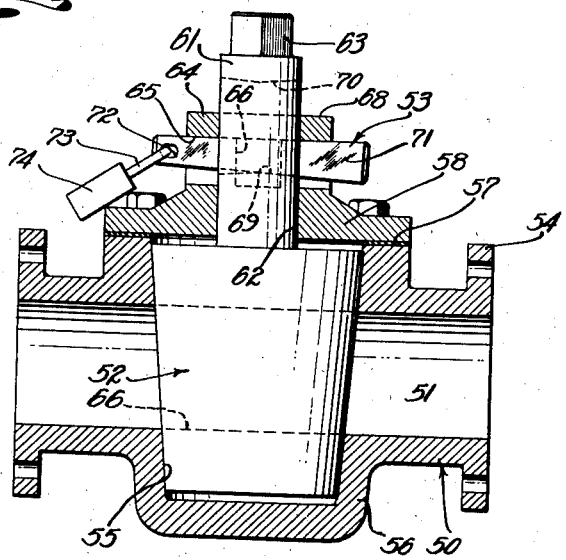

Jan. 26, 1943. T. A. CREIGHTON 2,309,304
VALVE DEVICE
Filed Sept. 23, 1940 2 Sheets-Sheet 1
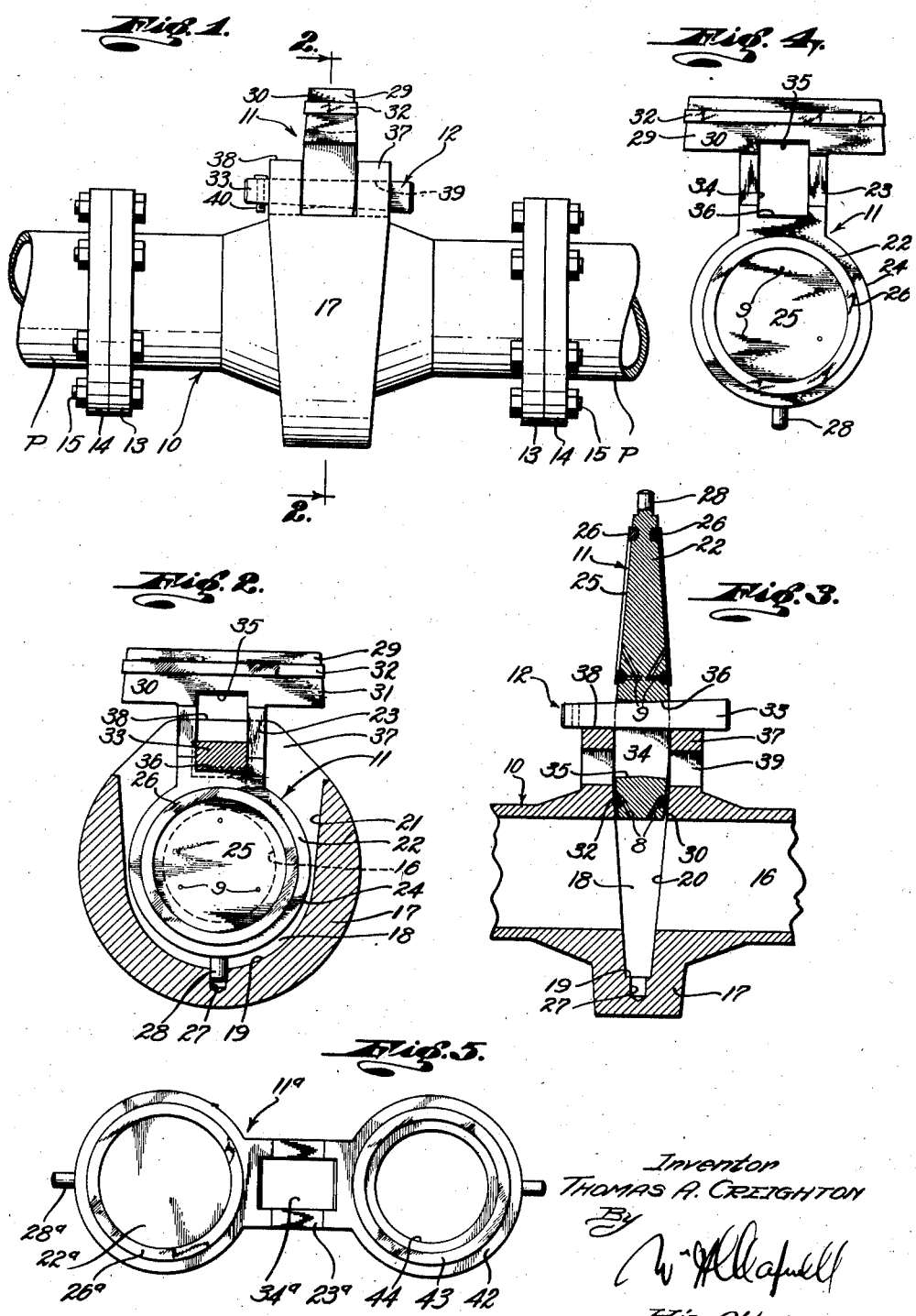
Inventor
THOMAS A. CREIGHTON
By
His Attorney Jan. 26, 1943. T. A. CREIGHTON 2,309,304
VALVE DEVICE
Filed Sept. 23, 1940 2 Sheets-Sheet 2

Inventor
THOMAS A. CREIGHTON
By
His Attorney

Patented Jan. 26, 1943

2,309,304

UNITED STATES PATENT OFFICE 2,309,304

VALVE DEVICE

Thomas A. Creighton, Long Beach, Calif., assignor of one-third to Thomas E. McMahan, Taft, and one-third to Martha H. Wright, Los Angeles, Calif.

Application September 23, 1940, Serial No. 357,865

11 Claims. (Cl. 251—59)

This invention relates to a device for controlling or cutting off the flow of fluid in pipe lines, etc. and relates more particularly to line blinds for blinding off or closing pipe lines and the like. A general object of this invention is to provide a very simple and easily operated valve device or line blind.

Devices known as line blinds are often installed in pipe lines to provide for the complete cutting off of the fluid flow at will. The simple forms of line blinds comprise flanges on the ends of adjacent pipe sections and lines or blank plates clamped between the flanges. Much difficulty is sometimes encountered in spreading the pipe flanges to permit the insertion and removal of the blind plates and the plates often stick or bind between the flanges. The flanges and pipe parts are frequently injured in removing and installing the blind plates. Other types of line blinds and line blind fittings have been introduced but in most cases these later devices are expensive to manufacture and involve complicated plate shifting means requiring the use of wrenches or special tools.

Another object of this invention is to provide a valve device or line blind of the character referred to in which the flow cut-off member or closure may be easily and quickly installed without spreading or disturbing the pipes and may be easily and quickly removed, reversed in position and replaced.

Another object of this invention is to provide a line blind embodying novel means for quickly and effectively seating the cut-off member or closure to prevent the leakage of fluid past or around the same, which means is readily operable to raise or free the closure for easy removal, shifting or replacement.

Another object of the invention is to provide a line blind or valve device in which the means for setting and freeing the closure is a simple wedge means devoid of threads, requiring no accurate expensive machining and fully operable by merely driving or pushing the wedge means.

Another object of this invention is to provide a valve device or line blind in which the closure may be fully seated and sealed and may be freed for easy removal or reversal without loosening threaded parts and without the possibility of injuring the pipe parts or the line blind parts.

A further object of this invention is to provide a line blind or valve device in which the closure is tapered to conform to a tapered seat in the body and may carry packing whereby it closely and fully seals with the body to prevent the leakage of fluid.

Figure 8:
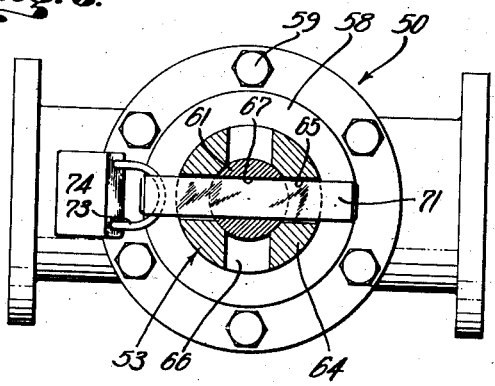
Figure 6:
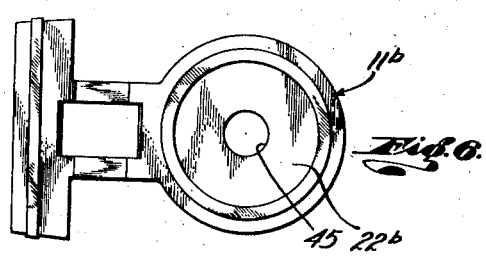

The various objects and features of my invention will be fully understood from the following detailed description of typical preferred forms and applications of the invention, throughout which description reference is made to the accompanying drawings, in which:

Fig. 1 is a side elevation of one form of the invention showing the closure in the closed or operative position. Fig. 2 is a vertical or transverse detailed sectional view taken as indicated by line 2—2 on Fig. 1. Fig. 3 is a fragmentary longitudinal detailed sectional view of the device shown in Fig. 1 with the closure in the open position and the wedge element arranged to free the closure for removal. Fig. 4 is a side or end elevation of the closure of Figs. 1, 2 and 3 removed from the body. Fig. 5 is a side elevation of another form of closure suitable for use in the structure shown in Figs. 1, 2 and 3. Fig. 6 is an elevation view of still another form of flow control member. Fig. 7 is a central longitudinal detailed sectional view of another form of the invention with the plug or closure in the closed position, and Fig. 8 is a plan view of the device shown in Fig. 7 with the upper portion in horizontal cross section.

The embodiment of the invention illustrated in Figs. 1 to 4, inclusive, of the drawings may be said to comprise, generally, a body 10 to be connected in a pipe line or the like, a cut-off member or closure 11 for installation in the body 10 and means 12 for seating the closure 11 in the body 10 and for freeing the closure for easy removal.

The body 10 is formed for ready connection in a pipe line or other fluid handling device and is shaped to carry or receive the closure 11. In the typical application illustrated the body 10 is formed to be mounted between a pair of spaced pipes P, being provided at its opposite ends with annular flanges 13 for mating with standard pipe flanges 14 on the pipes P. The flanges 13 and 14 may be connected by bolts 15. It is apparent that the body 10 may be otherwise shaped for attachment in the pipe line, for example, its end parts may be threaded or shaped for welding. A central longitudinal opening 16 extends through the body 10 from one end to the other to have its ends in communication with the pipes P and thus handle the fluid in the pipe line. The fluid passage or opening 16 may be straight and cylindrical, as illustrated. The body 10 is provided with an enlarged or thickened portion 17 between its ends and this thickened portion 17 has a transverse seat, socket or opening 18 for receiving the closure 11. The opening 18 is transverse of the fluid passage or opening 16 and is open at what I will term the top of the body portion 17 to permit the insertion and removal of the closure 11. The transverse opening 18 terminates within the body 10 having a closed lower wall 19. The opening 18 intersects the fluid opening 16 and its lower portion, below the opening 16 is closed by the end wall 19, which is curved to be concentric with the axis of the opening 16. In the form of the invention being described the opening 18 is substantially rectangular in transverse cross section having flat side walls 20 and flat end or edge walls 21. In accordance with the invention the opening 18 is tapered, that is, the side walls 20 slope downwardly and inwardly toward one another and the walls 21 slope downwardly and inwardly to merge with the curved lower wall 19.

The cut-off member or closure 11 is adapted to be seated or inserted in the opening 18 to close off the flow through the opening 16 and is operable to close off the upper end of the opening 18 when arranged in a position to permit the free flow of fluid through the opening 16. The closure 11 includes a body portion 22 and a reduced stem 23 on the portion 22. The body portion 22 of the closure 11 is disc-shaped in side view having a cylindrically curved margin or edge 24 whose ends merge with the stem 23. The body portion 22 of the closure 11 is proportioned to enter and seat in the opening 18 to close off the fluid opening 16. The side surfaces 25 of the body portion 22 are flat and are preferably downwardly convergent and disposed at substantially the same angles as the side walls 20 of the opening 18. Sealing means or packing means may be provided on the portion 22 of the closure 11 to seal with the walls of the opening 18. Rings 26 of suitable packing or sealing material may be set in grooves in the opposite sides of the body portion 22 to protrude from the surfaces 25 for sealing engagement with the walls 20. The rings 26 are proportioned and arranged to surround the fluid opening 16 in substantially concentric relation thereto when the closure 11 is in its closed seated position. Fluid pressure ports 9 may be provided in the closure 11 to conduct fluid pressure to the grooves containing the rings 26 so that the rings are actuated by the line pressure when the closure is in the closed position. The sealing rings 26 are not essential in every instance and the surfaces 25 may be formed and finished to directly seal with the walls 20 of the opening 18. It will be seen that when the rings 26 on the surfaces 25 seal with the tapered walls 20 that the closure fully closes off the fluid opening 16 and prevents the leakage of fluid outwardly through the opening 18.

Means is provided for guiding and centering the closure 11 in the body opening 18. The sloping or downwardly convergent walls 21 of the opening 18 are engageable by the curved periphery of the closure portion 22 to guide the closure into the opening 18. A central vertical socket 27 is provided in the lower wall 19 of the opening 18. A dowel or pin 28 projects from the lower or inner end of the closure 11 and is adapted to cooperate with the socket 27. The engagement of the pin 28 in the socket 27 accurately locks and centralizes the closure portion 22 in the opening 18. The edge walls 21 start or direct the body portion 22 of the closure 11 when the closure is entered in the body 10, guiding the member 11 to bring the pin 28 into the socket 27.

The type or form of closure 11 illustrated in Figs. 1 to 4, inclusive, of the drawings, includes a transverse or substantially horizontal head 29 on the stem 23. The stem 23 may be a flat sided part of rectangular cross section integrally joined with the body portion 22 of the closure and the head 29 may be in turn integrally connected with the stem 23. The head 29 is designed to occupy the upper portion of the opening 18 to close the same when the closure is inverted or arranged in its open position, illustrated in Fig. 3 of the drawings. The sides 30 of the head 29 are convergent and have substantially the same pitch as the side walls 20 of the opening 18 and the ends 31 of the head 29 are convergent having substantially the same pitch as the edge walls 21. A strip or ring 32 of a suitable packing material is set in a groove in the head 29 to seal with the walls 20 and 21. When the closure 11 is to be arranged in its open position to allow the free flow of fluid through the opening 16, the head 29 is entered downwardly in the opening 18 and the sealing ring 32 comes into sealing engagement with the walls 20 and 21. The head 29 may be shaped and proportioned to be entirely clear of the fluid opening 16 when finally seated in the opening 18. One or more pressure or fluid ports 8 communicate with the groove containing the ring 32 to put the groove in communication with the opening 16 so that the sealing ring is actuated by the line pressure.

The means 12 is a feature of the invention serving to effectively seat the closure 11 in the body opening 18 and operable to raise or release the closure for ready removal. The means 12 includes or provides surfaces on the body 10 and closure 11 engageable by a wedge 33. The stem 23 of the closure 11 has an opening 34 passing horizontally or transversely through it and the opposite end walls 35 and 36 of this opening are adapted to be acted on by the wedge 33. The opening 34 is preferably vertically elongated and may have flat vertical side walls. The end walls 35 and 36 of the opening 34 may be slightly convex as illustrated.

The means 12 further includes a pair of lugs or ribs 37 on the upper end of the enlarged body portion 17. The ribs 37 are preferably integral parts of the body 10 and are arranged at opposite sides of the opening 18 at the top or mouth of the opening. The upper surfaces 38 of the ribs 37 are flat and horizontal, while the sides of the ribs may be flat and vertical. Aligned transverse or horizontal openings 39 are provided in the ribs 37. The openings 39 may be square or rectangular in transverse cross section and are formed to receive the wedge 33. The opening 34 in the closure stem 23 is proportioned and located to have a part communicate with the openings 39 and a part open at or above the top rib surfaces 38 when the closure 11 is seated either in the closed position of Figs. 1 and 2 or the open position of Fig. 3. When the closure 11 is arranged in the closed position the wall 36 of the opening 34 is above the lower walls of the openings 39 and when the closure is in the open position, shown in Fig. 3, the wall 35 is in a plane above the lower walls of the openings 39.

The wedge 33 is adapted to be passed through the openings 39 to cooperate with the wall 35 or the wall 36, depending upon the position of the closure 11 to seat the closure and to retain the closure in place and is adapted to be passed through the portion of the opening 34 above the ribs 37 to cooperate with the surfaces 38 for the purpose of raising or freeing the closure. The wedge 33 may be a simple elongate member of square or rectangular cross section. The upper and lower surfaces of the wedge 33 are convergent. The wedge 33 is sufficiently long to project beyond the ribs 37 when in position. The small end of the tapered wedge 33 may have a transverse opening for receiving a pin 40 to lock or retain the wedge against loss.

When it is desired to close off the flow through the pipe P the closure 11 is passed into the opening 18 to have its main portion 22 extend across the fluid opening 16 and to have its head 29 above the ribs 37. This position of the closure 11 is shown in Figs. 1 and 2. The pin 28 cooperating with the socket 27 accurately centers or locates the closure portion 22 in the opening 18. The wedge 33 is passed through the openings 39 to extend through the lower part of the opening 34. The lower surface of the wedge 33 engages the wall 36. When the wedge 33 is forced or driven inwardly it cooperates with the wall 36 and reacts against the upper walls of the openings 39 to drive or urge the closure 11 inwardly. This causes the sealing rings 26 and possibly the surfaces 25 to tightly seal with the tapered walls 20 of the opening 18. The peripheral surface 24 of the closure 11 remains clear of the wall 19 so that the closure may be effectively seated by the wedge 33. When the wedge 33 has been driven through the openings 39 to tightly seat the closure 11 the pin 40 may be arranged in place to retain the wedge. With the wedge 33 in position in the openings 39 it acts as a key to hold the closure 11 in the sealed and seated position.

When it is desired to remove the closure 11 for reversal or replacement the pin 40 is removed and the wedge 33 is driven from the openings 39. The small end of the wedge 33 may be tapped or struck with a suitable tool to loosen the wedge whereupon the wedge may be easily withdrawn. The wedge 33 is then passed through the portion of the opening 34 at the tops of the ribs 37 and is advanced or driven so that its lower side cooperates with the surfaces 38 and its upper side wedges against the wall 35. The wedge 33 acting against the wall 35 lifts the closure 11 or urges the closure upwardly so that it is freed from the opening 18. The closure 11 may then be easily removed from the opening 18.

To provide for the free flow of fluid through the opening 16 and pipes P the closure 11 is arranged in the position where its head 29 occupies the upper portion of the opening 18. This position of the closure 11 is shown in Fig. 3. The head 29 is readily seated and secured in the open position by passing the wedge 33 through the openings 39 and the lower part of the opening 34 to engage with the wall 35. The wedge 33 cooperating with the upper walls of the openings 39 of the wall 35 effectively forces the head 29 downwardly in the tapered opening 18 so that its sealing ring 32 and tapered surfaces 30 and 31 seat and seal in the opening 18. The wedge 33 may be left in place to retain the closure 11 in the open position.

To free the closure 11 when in the open position the wedge 33 is withdrawn from the openings 39 and is driven through the upper part of the opening 34 to react between the surfaces 38 and the wall 36. This action of the wedge 33 lifts the head 29, freeing it from the opening 18 and permitting easy upward withdrawal of the closure.

Fig. 5 of the drawings illustrates a form of blind, plate or closure 11a suitable for use in the device of Figs. 1, 2 and 4, inclusive, in place of the closure 11. The closure 11a comprises a body portion 22a similar to or identical with the portion 22, a stem 23a similar to the stem 23 and an annular or perforate portion 42 on the stem 23a. The portion 22a may have sealing rings 26a on its opposite sides and is tapered to seat in the opening 18. The stem 23a has an elongate transverse opening 34a similar to the opening 34.

The closure portion 42 is designed to occupy the opening 18 when the closure 11a is in the open position and had downwardly convergent side surfaces which may be provided with sealing rings 43 for sealing in the opening 18. A transverse opening 44 is provided in the portion 42 to communicate or register with the fluid opening 16. The opening 44 may be of the same diameter as the fluid opening 16 so that the fluid has a free undisturbed flow through the device when the closure 11a is in the open position. Pins 28a may be provided on the portions 22a and 42 to center the closure in the opening 18. It will be apparent how the closure 11a may be arranged with either the portion 22a or the portion 42 in the opening 18 and how it may be seated by the wedge 33 and freed by the wedge 33 in the same manner as the closure 11.

While I have referred to the elements 11 and 11a as closures it is to be understood that these parts may be formed to fully close the fluid opening 16 or to only partially close or restrict the opening 16. The closure portions 22 and 22a, instead of being fully closed or imperforate, may have openings similar to the opening 44 but of less diameter to act as orifice plates to reduce the pressure of the fluid flowing through the pipes P. Thus, in Fig. 6 of the drawings I have illustrated a closure 11b, similar to the closure 11, provided with an orifice 45 in its portion 22b, which is considerably smaller in diameter than the fluid opening 16. When the closure 11b is employed the device may be termed an orifice meter fitting or orifice plate fitting.

The form of valve device illustrated in Figs. 7 and 8 may be said to comprise, generally, a body 50 having a fluid passage 51, a plug or closure 52 in the body 50 and means 53 for tightly seating the closure in the body and operable to free the closure for easy movement or turning.

The body 50 is adapted to be connected in a pipe line, or the like, and its ends are provided with means to facilitate its connection in the line. In the case illustrated, flanges 54 are provided on the opposite ends of the body 50 to connect with pipe line flanges. The fluid passage 51 extends completely through the body 50 from one end to the other to have its ends in communication with the pipe parts. A transverse socket, seat or opening 55 is provided in the body 50 to intersect the fluid passage 51. With the device positioned as illustrated in the drawings, the opening 55 extends downwardly in the body 50 to intersect the horizontal passage 51. The opening 55 is larger in diameter than the passage 51 to fully intersect the passage and is formed in a thickened or enlarged intermediate portion 56 of the body 50. In this form of the invention the opening 55 is round in transverse cross section and is frusto-conical or tapered having downwardly and inwardly sloping walls. The enlarged portion 56 of the body has a flat horizontal face 57 at its upper end surrounding the upper end of the opening 55. The body 50 is provided with a head or cap 58. The cap 58 is arranged at the upper end of the body portion 56 to overlie the face 57 and is secured to the body by bolts or studs 59.

The closure member 52 is arranged in the body opening 55 and is operable between open and closed positions. The member 52 is a tapered plug-like part of round cross section, whose outer surface is adapted to wedge and seal in the tapered opening 55. The closure member 52 may have any selected form of packing means for sealing with the wall of the opening 55 or may be formed for direct engagement with the wall of the opening. In the preferred construction the closure member 52 is proportioned so that its upper end is clear of the cap 58 and its lower end is clear of the bottom wall of the opening 55 when seated in the opening. A transverse opening 60 is provided in the closure member 52 to communicate with the fluid passage 51 when the member is in the open position. The opening 60 may be of the same diameter as the passage 51 and may be located to accurately register with the passage 51 when the closure member is in the open position. In the event the device is to be employed as a pressure controller or orifice meter fitting the opening 60 may be considerably smaller in diameter than the passage 51 to have a pressure-reducing effect upon the fluid flowing through it. A reduced stem 61 is provided on the upper end of the closure member 52 and projects upwardly through a central opening 62 in the cap 58. The stem 61 is turnable in the opening 62. The upper end part of the stem 61 is formed to facilitate turning of the closure member 52. In the case illustrated, the stem 61 has a polygonal upper end part 63 for receiving a turning handle, wheel or wrench.

The means 53 for seating and freeing the closure member 52 includes a central boss 64 on the upper side of the cap 58. The boss 64 is provided with a transverse opening 65 intersecting the opening 62. The longitudinal axis of the opening 65 is parallel with the longitudinal axis of the the fluid passage 51. The boss 64 has a second transverse opening 66, which intersects the opening 62 and which extends at right angles to the opening 64. The openings 65 and 66 lie in the same horizontal plane and are preferably of the same size and shape. In the case illustrated, the openings 65 and 66 are square or rectangular in cross section.

The means 53 further includes a transverse opening 67 in the stem 61. The opening 67 is in the form of a slot, being vertically elongated. The opening 67 is arranged and proportioned to have a lower part communicate with the opening 65 or the opening 66 and to have an upper portion above the upper surface 68 of the boss 64. The lower wall 69 of the opening 67 is some distance above the plane occupied by the lower walls of the opening 65 and 66, while the upper wall 70 of the opening 67 is some distance above the surface 68. It is preferred to form the opening 67 so that its horizontal axis is parallel with the longitudinal axis of the opening 60.

The means 53 further includes a wedge 71 insertable through the openings 65 and 66 to cooperate with the opening 67. The wedge 71 may be a simple elongate member of square or rectangular cross section having convergent upper and lower sides. The wedge 71 is of sufficient length to have its opposite end portions extend beyond the boss 64 when in the operative position. The small end portion of the wedge 71 may have a transverse opening 72 to receive the eye or shackle 73 of a padlock 74.

In the use or operation of the device illustrated in Figs. 7 and 8 the closure 52 is adapted to serve as a plug or gate to fully cut off the fluid passage 51. With the wedge 71 removed and the plug or closure 52 free the stem portion 68 may be engaged to turn the plug to the position where its opening 60 is transverse of the passage 51. With the member 52 turned to this position the opening 67 is aligned with the opening 66. The wedge 71 is passed through the opening 66 and the lower part of the opening 67 and is driven inwardly so that its lower side wedges against the wall 69. This drives the member 52 downwardly to tightly seal or seat in the opening 55. The padlock 74 may then be arranged in place to lock the wedge 71 against removal.

When it is desired to turn the plug to the open position the padlock 74 is removed and the wedge 71 is driven from the openings 66 and 67. The wedge 71 is then inserted in the upper part of the opening 67 to cooperate with the surface 68 and the wall 70. The wedge 71 is driven inwardly and its engagement with the wall 70 raises the member 52 to free it from the opening 55. The plug or member 52 may then be easily turned to bring its opening 60 into communication with the opening 51. With the member 52 in the open position the wedge 71 is passed through the opening 65 and the lower part of the opening 67 and is driven inwardly. The wedge cooperates with the wall 69 to drive the tapered member 52 downwardly in the tapered opening 55. This tightly seals and seats the member in the opening 55. The padlock 74 may then be arranged in place to lock the wedge 71.

When it is desired to free the member 52 for turning from the open position to the closed position, the padlock 74 is removed and the wedge 71 is driven or disengaged from the openings 65 and 67 and is passed through the upper part of the opening 67 to engage with the surface 68. The wedge is then driven inwardly and its cooperation with the surface 68 and the wall 70 lifts the member 52. The member 52 is then free for turning. It will be observed that the wedge 71 acts as a pointer or indicator to indicate the open and closed positions of the member 52.

Having described only typical preferred forms and applications of my invention I do not wish to be limited or restricted to the specific details herein set forth, but wish to reserve to myself any variations or modifications that may appear to those skilled in the art or fall within the scope of the following claims.

Having described my invention, I claim:

1. A device of the character described comprising a body having a fluid passage and a tapered opening intersecting the passage, a tapered member in the opening extending across the passage, a surface on the body facing inwardly with respect to said opening and a second surface on the body facing outwardly with respect to said opening, a surface on the member spaced from the first named surface and facing outwardly and a second surface on the member spaced from said second surface of the body and facing inwardly, and a wedge adapted to be driven between said first named surface of the body and the first named surface of the member to force the member inwardly in the opening and adapted to be driven between said second surfaces of the body and member to force the member outwardly.

2. A device of the character described comprising two elements, one a body having a fluid passage and a tapered socket intersecting the passage, the other a tapered member in the socket, one element having an opening presenting spaced opposing walls, two spaced surfaces on the other element each spaced from and opposing one of said walls, and a wedge adapted to be driven between one of said walls and the opposing surface to force the member inwardly in said socket and adapted to be driven between the other wall and the surface opposing the same to move the member outwardly in said opening.

3. A device of the character described comprising a body having a fluid passage and a tapered socket intersecting the passage, a tapered member fitting the socket and having an outwardly extending part, a head on the body around said part presenting an outwardly facing end surface and having a transverse opening, said part having a transverse opening with an upper portion above said end surface and a lower portion communicating with the upper part of the first named opening, and a wedge adapted to be driven into said upper portion of the last named opening to move the member outwardly and adapted to be driven through said first named opening to force the member inwardly.

4. A device of the character described comprising a body having a fluid passage and a tapered opening intersecting the passage, a member comprising a tapered portion adapted to fit the opening and extend across the passage, a stem on said portion adapted to extend from the body and a part on the stem adapted to be arranged in the opening when the member is reversed in position and leaving the passage open, and wedge means operable to urge the member outwardly to free it for movement when said portion or said part is in the opening.

5. A device of the character described comprising a body having a fluid passage and a tapered opening intersecting the passage, a flow control member comprising a stem, a portion on one end of the stem adapted to fit the tapered opening and extend across the passage, and a part on the other end of the stem adapted to close the outer end of the tapered opening when the member is inverted, and means for urging the member into the tapered opening and for urging the member outwardly to free it for easy movement when the member has said portion or said part in the tapered opening.

6. A device of the character described comprising a body having a fluid passage and a tapered opening intersecting the passage, a flow control member comprising a stem, a portion on one end of the stem adapted to fit the tapered opening and extend across the passage, and a part on the other end of the stem adapted to close the outer end of the tapered opening when the member is inverted, and means for urging the member into the tapered opening and for urging the member outwardly to free it for easy movement when the member has said portion or said part in the tapered opening, said means comprising a head on the member having a transverse opening and presenting an outwardly facing surface, the stem having a transverse opening which partially communicates with the transverse opening and has a portion beyond said surface with the member in either position, and a wedge to be driven in the first named transverse opening to force the member inwardly and adapted to be driven through the said portion of the second named transverse opening to engage said surface and move the member outwardly.

7. A device of the character described comprising a body having a fluid passage and a tapered socket intersecting the passage, a flow control member having a stem, a tapered plate on each end of the stem designed to fit the socket, one plate serving to close the passage, the other allowing flow through the passage, the stem having a transverse opening, ribs on the body having aligned transverse openings which register with the first named opening when either plate of the member is in the socket, and a wedge adapted to be driven through said aligned openings to force the member inwardly and adapted to be driven through the outer part of the opening in the stem to cooperate with the ends of the ribs and force the member outwardly when either plate is in the socket.

8. A device of the character described comprising two elements, one a body having a fluid passage and a tapered socket intersecting the passage, the other a tapered member in the socket, one element having an opening presenting spaced opposing walls, two spaced surfaces on the other element each spaced from and opposing one of said walls, and a wedge adapted to be driven between one of said walls and the opposing surface to force the member inwardly in said socket and adapted to be driven between the other wall and the surface opposing the same to move the member outwardly in said opening and lock means for preventing removal of the wedge.

9. A device of the character described comprising a body having a fluid passage and a tapered opening intersecting the passage, a tapered plug in the socket turnable between open and closed positions, and wedge means operable to force the plug inwardly and operable to move the plug outwardly when the plug is in either of said positions, said means including a stem on the plug having a transverse opening, a head on the body having transverse openings communicating with the first named opening when the plug is in said positions, and a wedge to be driven through the second named openings to cooperate with the first named opening to force the plug inwardly and adapted to be driven through said first named opening to cooperate with the top of the head and raise the plug.

10. A device of the character described comprising a body having a fluid passage and a tapered opening intersecting the passage, a tapered plug in the socket turnable between open and closed positions, and wedge means operable to force the plug inwardly and operable to move the plug outwardly when the plug is in either of said positions, said means including a stem on the plug having a transverse opening, a head on the body having transverse openings communicating with the first named opening when the plug is in said positions, a wedge to be driven through the second named openings to cooperate with the first named opening to force the plug inwardly and adapted to be driven through said first named opening to cooperate with the top of the head and raise the plug, the wedge having an opening, and a padlock engageable in the opening in the wedge to lock the wedge in place.

11. A device of the character described comprising a body having a fluid passage and a chamber intersecting the passage, a member in the chamber extending across the passage, and a single wedge means for moving the member in one direction to tightly seat it in the opening and for moving the member in the other direction to free it for removal, said means including two sets of opposing faces on the body and member lying substantially transversely of said directions, and a wedge adapted to be driven between the faces of one set to move the member in one direction and adapted to be driven between the faces of the other set to move the member in the other direction.

THOMAS A. CREIGHTON.